United States Patent [19]

Kämpf et al.

[11] Patent Number: 5,213,714
[45] Date of Patent: May 25, 1993

[54] ELECTROCONDUCTIVE COATING, COMPOSITION, A PROCESS FOR THE PREPARATION THEREOF, AND THE USE THEREOF

[75] Inventors: Günther Kämpf, Oestrich-Winkel; Michael Feldhues, Bad Soden am Taunus, both of Fed. Rep. of Germany

[73] Assignee: Hoechst Aktiengesellschaft, Frankfurt am Main, Fed. Rep. of Germany

[21] Appl. No.: 308,894

[22] Filed: Feb. 9, 1989

[30] Foreign Application Priority Data

Feb. 13, 1988 [DE] Fed. Rep. of Germany ....... 3804521

[51] Int. Cl.⁵ .............................................. H01B 1/00
[52] U.S. Cl. .................................. 252/500; 526/256; 526/258
[58] Field of Search ................. 252/500; 526/256, 258

[56] References Cited

U.S. PATENT DOCUMENTS

| | | | |
|---|---|---|---|
| 4,599,194 | 7/1986 | Frommer et al. | 252/500 |
| 4,711,742 | 12/1987 | Jen et al. | 252/500 |
| 4,719,286 | 1/1988 | Matlow | 252/500 |
| 4,769,115 | 9/1988 | Satoh et al. | 252/500 |
| 4,781,443 | 11/1988 | Giles | 252/500 |
| 4,900,782 | 2/1990 | Han et al. | 524/398 |

FOREIGN PATENT DOCUMENTS

| | | |
|---|---|---|
| 0203438 | 12/1986 | European Pat. Off. . |
| 0253594 | 1/1988 | European Pat. Off. . |
| 0292905 | 11/1988 | European Pat. Off. . |
| 3717668 | 11/1988 | Fed. Rep. of Germany . |

OTHER PUBLICATIONS

A. F. Barton, *Handbook of Solubility Parameters and Other Cohesion Parameters*, CRC Press, 1983, pp. 153-162.

*Primary Examiner*—Mark L. Bell
*Assistant Examiner*—Deborah Jones
*Attorney, Agent, or Firm*—Connolly & Hutz

[57] ABSTRACT

A coating composition comprising a soluble electroconductive polymer of substituted thiophenes and, if appropriate, a soluble non-conductive polymer produces, when applied from the solution in an aprotic solvent, highly adherent, electroconductive coatings on non-conductive or semiconducting materials. In this way, antistatic films and fibers and mouldings for the purposes of electronics and electrics can be produced.

18 Claims, No Drawings

ELECTROCONDUCTIVE COATING COMPOSITION, A PROCESS FOR THE PREPARATION THEREOF, AND THE USE THEREOF

The invention relates to an electroconductive coating composition which is capable of preventing electrostatic charge of surfaces, a process for the preparation thereof, and the use thereof.

Packing materials made from very highly insulating plastics must usually be provided with an antistatic finish for reasons of industrial safety, such as, for example, explosion protection. In this case, transparent conductive films are particularly desirable since they make it possible to identify the contents.

The high electrostatic chargeability of customary plastics also results in difficulties in the case of other uses:

Poor winding behavior of calendered films and fibers.

Adhesion of film webs to one another during processing and in filling machinery.

Sparking during emptying of plastic drums can result in dangerous explosions in the presence of explosive gas/air mixtures (for example solvents).

The printability of plastic parts is lost.

During storage, plastic parts attract dust and become soiled.

If sensitive electronic parts are packed, they are destroyed by electrostatic charge during unpacking.

Photographic films and X-ray films can be rendered unusable due to electrostatic discharge causing marks on the film.

There are several ways of dissipating charge on the plastic surface:

a) Compounds made from plastics and carbon black or a metal powder or metal fibers. Since they only become active when the conductive particles are in contact (percolation), it is necessary to add large amounts of conductive material (typically 5% to 30%). The typical properties of the plastic are thereby greatly changed, its mechanical properties become significantly worse and the optical properties, such as transparency and color, are totally changed.

b) In the case of some plastics, the surfaces can be modified by an intensive corona discharge to the extent that electrostatic charge no longer occurs. Unfortunately, the effect falls off after only a short time, which means that this method cannot be used in the longer term and is often only employed to improve the coatability.

c) By adding antistatics to the plastic surface, for example by dipping, impregnating or spraying, conductive surfaces are produced. However, these antistatics can also be introduced into the volume of plastic, thus achieving a long-term action. In both cases, it is of great disadvantage that the surface resistance of the plastics treated in this way are greatly dependent on the atmospheric humidity; in particular, the activity of the materials decreases rapidly if they are exposed to very low humidity.

d) Plastics can be coated with metals or inorganic semiconductors by vapor deposition in vacuo or by sputtering. These metal coatings must be applied very thinly if adequate transparency is required. Consequently, these coatings are very sensitive and would have to be protected against mechanical and chemical damage by additional coatings. This process is complicated, involved and expensive. In addition, the choice of materials which can be used is limited by susceptibility to corrosion. In addition, metal coatings vapor-deposited on plastic films frequently exhibit poor coating adhesion, which has to be improved by additional process steps, such as, for example, the above-mentioned corona treatment. In these multi-layered film systems, the metal coating is also protected externally against mechanical damage by a dielectric coating whose thickness must again be observed very precisely in order to achieve the surface resistance desired. Together with a customary antistatic coating on the inside of the film, a storage effect for the electrical charge can also occur, which means that electrostatic charging is only prevented to an inadequate extent. Products of this type are therefore only suitable for screening against external fields (Faraday cage).

In addition, a process has already been proposed for the production of electroconductive coatings which substantially avoids the above-described shortcomings (cf. DE-A-3,717,668). However, mainly dipolar aprotic solvents, which, in industrial processes, result in high costs for personal protection and require additional safety precautions during equipment design, are employed therein. In addition, although the conductive coatings of oligomers described therein are transparent in the visible region of the optical spectrum, they are, however, significantly colored in this region due to their strong absorption. This makes these conductive coatings less suitable for some applications.

The object of the present invention is therefore to find electroconductive coatings which do not have the above-mentioned disadvantages and can be applied simply to any desired surfaces.

It has been found that a coating composition comprising a soluble electroconductive polymer of substituted thiophenes and a soluble non-conductive polymer can produce a highly adherent electroconductive coating on various substrates.

The invention thus relates to an electroconductive coating composition comprising 10 to 100% by weight of a polymer containing structural units which are connected together by linking in the 2-position and/or 5-position, comprising, on statistical average, 60 to 100% mol-% of structural units derived from at least one monomer of the formula (I)

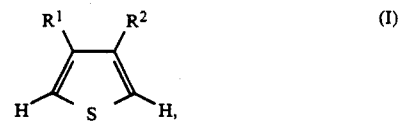

in which $R^1$ represents a straight-chain or branched $C_6$–$C_{30}$-alkoxy group and $R^2$ represents a hydrogen atom or a $C_1$–$C_{30}$-alkoxy group, 0 to 40 mol-% of structural units derived from at least one monomer of the formula (II)

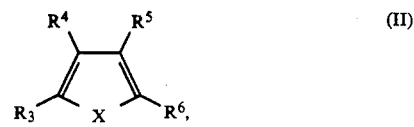

in which

R⁴ and R⁵, independently of one another, denote a hydrogen atom, a halogen atom, a $C_1$-$C_{12}$-alkyl group, alkoxyalkyl, arylmethyl, aryl, a $C_1$-$C_4$-alkoxy group or -O(CH$_2$CH$_2$O)$_n$CH$_3$ where n=1 to 4, or form an aromatic ring together with the carbon atoms connecting them, R³ and R⁶, independently of one another, denote a hydrogen atom or R³ together with R⁴ and the carbon atoms connecting them or R⁵ together with R⁶ and the carbon atoms connecting them in each case form an aromatic ring, X denotes an oxygen atom, a sulfur atom, an NH group, N-alkyl group or N-aryl group, 0 to 40 mol-% of structural units derived from at least one monomer of the formula (III),

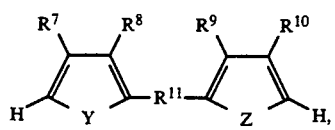

in which

R⁷, R⁸, R⁹ and R¹⁰, independently of one another, denote a hydrogen atom, a $C_1$-$C_{12}$-alkyl group, an aryl group or a $C_1$-$C_{30}$-alkoxy group, Y and Z, independently of one another, denote an oxygen atom, a sulfur atom, an NH group, N-alkyl group or N-aryl group, R¹¹ denotes an arylene group, a heteroarylene group or a conjugated system of formula (—CH=CH—)$_p$ in which p is zero, 1, 2 or 3, 0 to 40 mol-% of structural units derived from at least one compound of the formula (IV)

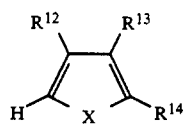

in which

R¹² and R¹³, independently of one another, denote a hydrogen atom, a halogen atom, a $C_1$-$C_{12}$-alkyl group, a $C_1$-$C_{30}$-alkoxy group, a $C_1$-$C_{12}$-acylamino group or a $C_1$-$C_{12}$-acylocy group, R¹⁴ denotes a halogen atom, a $C_1$-$C_{12}$-alkyl group, a $C_1$-$C_{30}$-alkoxy group, a $C_1$-$C_{12}$-acylamino group, a $C_1$-$C_{12}$-acyl group or a $C_1$-$C_{12}$-acyloxy group, and X is as defined above, where the electroconductive polymer, in the oxidized state, is fully soluble in aprotic solvents or solvent mixtures at 25° C. and solutions are obtained containing at least 0.5 g of the polymer in 100 cm³ of the solvent or solvent mixtures at 25° C., and 0 to 90% by weight of a non-conductive polymer which is dissolved or swollen in solvents with a $\delta_p$ value of less than 8.5 (cal/ccm)$^{\frac{1}{2}}$ and a $\delta_H$ value of less than 6.5 (cal/ccm)$^{\frac{1}{2}}$.

In addition, the invention also relates to a process for the preparation of the coating composition, which comprises dissolving or swelling an electroconductive polymer and, if appropriate, a non-conductive polymer together in a solvent with a $\delta_p$ value of less than 8.5 (cal/ccm)$^{\frac{1}{2}}$ and a $\delta_H$ value of less than 6.5 (cal/ccm)$^{\frac{1}{2}}$, and recovering the mixture from the solvent.

The coating composition according to the invention comprises an electroconductive polymer and, if appropriate, a non-conductive polymer.

The electroconductive polymer contains structural units derived linking in the 2-position and/or 5-position from at least one monomer of the formula (I)

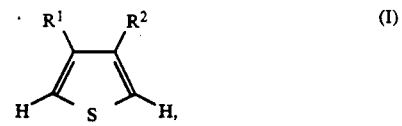

R¹ is a straight-chain or branched $C_6$-$C_{30}$-, preferably $C_8$-$C_{22}$- and in particular $C_{10}$-$C_{16}$-alkoxy group.

R² is, in particular, a hydrogen atom or a $C_1$-$C_{30}$-, preferably $C_1$-$C_{22}$- and in particular $C_6$-$C_{12}$-alkoxy group.

Examples of representatives of the formula (I) are 3-hexyloxythiophene, 3-heptyloxythiophene, 3-octyloxythiophene, 3-nonyloxythiophene, 3-decyloxythiophene, 3-undecyloxythiophene, 3-dodecyloxythiophene, 3-tetradecyloxythiophene, 3-pentadecyloxythiophene, 3-hexadecyloxythiophene, 3-octadecyloxythiophene, 3-eicosyloxythiophene, 3-docosyloxythiophene, 3-(2'-ethylhexyloxy)thiophene, 3-(2',4',4'-trimethylpentyloxy)-thiophene, 3,4-dihexyloxythiophene, 3,4-dioctyloxythiophene, 3,4-dinonyloxythiophene, 3,4-didodecyloxythiophene, 3-methoxy-4-pentyloxythiophene, 3-hexyloxy-4-methoxythiophene, 3-methoxy-4-nonyloxythiophene, 3-dodecyloxy-4-methoxythiophene, 3-docosyloxy-4-methoxythiophene, 3-ethoxy-4-pentyloxythiophene, 3-ethoxy-4-hexyloxythiophene, 3-butoxy-4-dodecyloxythiophene and 3-(2'-ethylhexyloxy)-4-methyoxythiophene.

The electroconductive polymers to be used according to the invention preferably contain 8 to 150, in particular 10 to 100, structural units. The amount of structural units derived from at least one monomer of the formula (I) is, on statistical average, 60 to 100 mol-%, preferably 90 to 100 mol-% and in particular 95 to 100 mol-%, based on the structural units present in the undoped polymer.

Suitable comonomers for the monomers of the formula (I) are preferably the monomers of the formulae (II), (III) and (IV).

Examples which may be mentioned here are compounds of the formula (II)

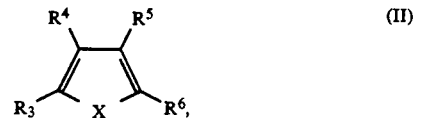

R⁴ and R⁵, independently of one another, are a hydrogen atom, a halogen atom, a $C_1$-$C_{12}$-, preferably $C_1$-$C_4$-alkyl group, an alkoxyalkyl group, preferably alkoxymethyl, an arylmethyl group, preferably benzyl or thienylmethyl, an aryl group, preferably phenyl or thienyl, a $C_1$-$C_4$-, preferably $C_1$-$C_2$-alkoxy group or -O(CH$_2$CH$_2$O)$_n$CH$_3$ wherein n=1 to 4, preferably 1 or 2, or, together with the carbon atoms connecting them, form an aromatic ring, preferably a benzene, a thiophene or pyrrole ring.

R³ and R⁶, independently of one another, are a hydrogen atom or, in each case with R⁴ or R⁵ and together with the carbon atoms connecting them, form an aromatic ring, preferably a benzene, thiophene or pyrrole ring.

X denotes an oxygen atom, a sulfur atom, an NH group, an N-alkyl group, preferably N-$C_1$-$C_4$-alkyl, or an N-aryl group, preferably N-phenyl.

Suitable compounds are pyrrole, 3-chloropyrrole, 3-methylpyrrole, 3,4-dimethylpyrrole, N-methylpyrrole, thieno[3,2-b]pyrrole, carbazole, thiophene, 3-methylthiophene, 3-octylthiophene, 3,4-dimethylthiophene, 3,4-diethylthiophene, 3-(methoxyethoxyethoxymethyl)thiophene, 3-(methoxyethoxyethoxymethyl)thiophene, 3-methoxythiophene, 3-ethoxythiophene, 3-propoxythiophene, 3-butoxythiophene, 3-(methoxyethoxy)thiophene, 3-(methoxyethoxyethoxy)thiophene, 3-methoxy-4-methylthiophene, 3-ethoxy-4-methylthiophene, 3-butoxy-4-methylthiophene, 3-ethyl-4-methoxythiophene, 3-butyl-4-methoxythiophene, 3-dodecyl-4-methoxythiophene, 3,4-dimethoxythiophene and thieno[2,3-b]thiophene, dithieno[3,2-b; 2',3'-d]thiophene, dibenzothiophene and isothianaphthene.

Further suitable comonomers for monomers of the formula (I) are those of the formula (III).

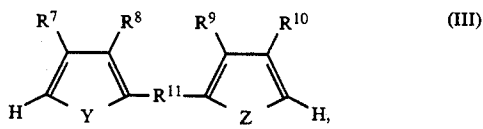

$R^7$, $R^8$, $R^9$ and $R^{10}$, independently of one another, are a hydrogen atom, a $C_1$-$C_{12}$-, preferably $C_1$-$C_4$-alkyl group, an aryl group, preferably phenyl or thienyl, or a $C_1$-$C_{30}$-, preferably $C_1$-$C_{12}$-alkoxy group.

Y and Z denote an oxygen atom, a sulfur atom, an NH group, an N-alkyl group, preferably N-$C_1$-$C_4$-alkyl, or an N-aryl group, preferably N-phenyl.

$R^{11}$ represents arylene, preferably phenylene, heteroarylene, preferably thienylene, furanylene or pyrrolylene or a system of the formula (—CH=CH—)$_p$ where p=1, 2, or 3.

Suitable compounds are, in particular, 1,2-di(2-thienyl)ethene, 1,2-di(3-methylthien-2-yl)ethene, 1,2-di(2-furanyl)-ethene, 1-(2-furanyl)-2-(2-thienyl)ethene, 1,4-di(2-thienyl)-buta-1,3-diene, 1,4-di(2-thienyl)benzene, 2,5-di(2-thienyl)-thiophene, (terthienyl), 2,5-di(2-thienyl)pyrrole, 2,2'-dithiophene, 3,3'-dimethyl-2,2'-bithiophene, 3,3'-dimethoxy-2,2'-bithiophene, 3,4'-dimethoxy-2,2'-bithiophene, 4,4'-dimethoxy-2,2'-bithiophene, 3,3'-dihexyloxy-2,2'-bithiophene, 4,4'-didodecyloxy-2,2'-bithiophene and 3-dodecyloxy-4'-methoxy-2,2'-bithiophene.

The amount of structural units derived from monomers of the formula (II) is, on statistical average, 0 to 40 mol-%, preferably 0 to 10 mol-%. The structural units derived from monomers of the formula (III) are present, on statistical average, to the extent of 0 to 40 mol-%, preferably 0 to 10 mol-%.

In addition, the end groups of the electroconductive polymers to be used according to the invention can be formed by structural units of the monomers of the formula (IV), which can be added to the monomers of the formula (I) in order to modify the degree of polymerization and the physical properties.

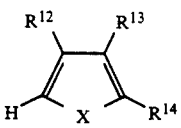

$R^{12}$ and $R^{13}$, independently of one another, are a hydrogen atom, a halogen atom, preferably chlorine or bromine, a $C_1$-$C_{12}$-, preferably $C_1$-$C_4$-alkyl group, a $C_1$-$C_{30}$-, preferably $C_1$-$C_{12}$-alkoxy group, a $C_1$-$C_{12}$-acylamino group, preferably acetylamino, or a $C_1$-$C_{12}$-acyloxy group, preferably acetyloxy.

$R^{14}$ is a halogen atom, preferably chlorine or bromine, a $C_1$-$C_{12}$-, preferably $C_1$-$C_4$-alkyl group, a $C_1$-$C_{30}$-, preferably $C_1$-$C_{12}$-alkoxy group, a $C_1$-$C_{12}$-acylamino group, preferably acetylamino, a $C_1$-$C_{12}$-acyl group, preferably acetyl, or a $C_1$-$C_{12}$-acyloxy group, preferably acetyloxy.

X is as defined above.

Examples of compounds of the formula (IV) are 2-bromothiophene, 2-chlorothiophene, 2-methylthiophene, 2-dodecylthiophene, 2-methoxythiophene, 2-hexyloxythiophene, 2-dodecyloxythiophene, 2-acetylaminothiophene, 2-bromo-3-methoxythiophene, 2-bromo-4-methoxythiophene, 2-chloro-3-methylthiophene, 2,3-dimethylthiophene, 2,4-dimethylthiophene, 2,3-dimethoxythiophene, 2,4-dimethoxythiophene, 3-methoxy-2-methylthiophene, 3-hexyloxy-2-methylthiophene, 2-methoxy-3-methylthiophene, 4-methoxy-2-methylthiophene, 2-acetylamino-3-methyoxythiophene, 2-acetylamino-4-methoxythiophene, 2,3,4-trimethylthiophene, 3,4-dimethyl-2-methoxythiophene, 2,4-dimethyl-3-methoxythiophene, 3,4-dimethyl-2-dodecyloxythiophene, 3,4-dimethoxy-2-methylthiophene, 2,3,4-trimethoxythiophene, 2-acetyl-3,4-dimethoxythiophene, 2-bromopyrrole, 2-chloropyrrole, 2-acetylpyrrole, 2-chloro-3-methylpyrrole, 2-bromo-3,4-dimethylpyrrole, 2-methylfuran, 2-methoxyfuran and 2,3,4-trimethylfuran.

As a consequence of the substitution in the 2-position, the compounds of the formula (IV) have a chain-terminating action. Their proportion is generally 0 to 40 mol-%, preferably less than 10 mol-%.

The above-mentioned comonomers of the formulae (II), (III) and (IV) can also be used mixed with one another. The preparation of the monomers of the formula (I) and of the comonomers of the formulae (II), (III) and (IV) is known from the prior art or described in German Patent Application P 3,804,522.2.

In oxidized form, the soluble, electroconductive polymers contain an appropriate number of anions in order to compensate for the positive charges. Specifically, these are preferably the anions of the conductive salt or of the oxidant employed in the preparation process. Examples which may be mentioned of suitable anions are: $BF_4^-$, $PF_6^-$, $PO_4^{3-}$, $AsF_6^-$, $SbCl_6^-$, $SO_4^{2-}$, $HSO_4^-$, alkyl-$SO_3^-$, perfluoroalkyl-$SO_3^-$, aryl-$SO_3^-$, $F^-$, $Cl^-$, $I_3^-$, $FeCl_4^-$, and $Fe[(CN)_6]^{3-}$. With loss of thermostability, $ClO_4^-$, $IO_4-$ and $NO_3-$ are also suitable. $BF_4-$, $PF_6-$, $CF_3SO_3-$ and p-toluenesulfonate are preferred according to the invention. Mixtures of the above-mentioned anions introduced into the polymer can also be present. The number of these anions relative to the number of monomer units, is usually 10 to 30%, preferably 15 to 25%.

The electroconductive polymers to be used according to the invention are prepared by oxidative polymerization, preferably by electrochemical (anodic) polymerization of the monomers.

The electroconductive polymers and their preparation are the subject-matter of Patent Application P 3,804,523.0.

The non-conductive polymer optionally also present in the coating composition according to the invention should be soluble or swellable in solvents or solvent mixtures with a $\delta p$ value (deltap value) of less than 8.5, preferably less than 5.5 $(cal/ccm)^{\frac{1}{2}}$ and a $\delta_H$ value (delta$_H$ value) of less than 6.5, preferably less than 5.0 $(cal/ccm)^{\frac{1}{2}}$.

Suitable non-conductive polymers are poly(vinyl formal), poly(vinyl acetal), poly(vinyl butyral), poly(vinyl acetate), poly(vinyl chloride), poly(vinyl methyl ether), poly(vinyl methyl ketone), poly(maleic anhydride), polystyrene, poly-N-vinylcarbazole, poly-N-vinylpyrrolidone, polyvinylpyridine, poly(methyl acrylate), poly(methyl methacrylate), polyacrylonitrile, polyacetaldehyde, polyacrolein, poly(ethylene oxide), polytetrahydrofuran, aliphatic polyesters, polycarbonate, poly(butyl isocyanate), natural rubber, cyclized rubber resins, polyurethane, methylcellulose, ethylcellulose, cellulose triacetate and polymethylsiloxne.

Preferred polymers are poly(methyl methacrylate), polystyrene, styrene-acrylonitrile copolymers, poly(vinyl acetate), poly(vinyl acetal), poly(vinyl chloride), cyclized rubber resins and polycarbonate.

Besides the electroconductive polymer and, if appropriate, the non-conductive polymer, the coating composition according to the invention can also contain further additives, such as, for example, stabilizers, plasticizers, pigments, dulling agents, lubricants and other additives.

The coating composition contains 10 to 100, preferably 30 to 90, % by weight, based on the total amount, of electroconductive polymer and 0 to 90, preferably 10 to 70, % by weight, based on the total amount, of non-conductive polymer. If necessary, further additives are added as well.

The solvent or swelling agents used for the electroconductive polymer and the non-conductive polymer are aprotic solvents having a $\delta_p$ value of less than 8.5, preferably less than 5.5 $(cal/ccm)^{\frac{1}{2}}$ and a $\delta_H$ value of less than 6.5, preferably less than 5.0 $(cal/ccm)^{\frac{1}{2}}$. The $\delta$ values are listed in A. F. Barton, Handbook of Solubility Parameters and other Cohesion Parameters, CRC Press 1983, pages 153–161.

Examples of suitable solvents are acetone, acetonitrile, N-methylpyrrolidone, nitromethane, nitropropane, $\gamma$-butyrolactone, methyl ethyl ketone, benzaldehyde, cyclohexanone, methyl isobutyl ketone, tetrahydrofuran, methylene chloride, butyl acetate, xylene, toluene and diethyl ether.

Preferred solvents are tetrahydrofuran, cyclohexanone, acetone, methyl isobutyl ketone, $\gamma$-butyrolactone, nitropropane, nitromethane and butyl acetate. The $\delta$ values of some suitable solvents are given below.

|  | $\delta_P[(cal/ccm)^{\frac{1}{2}}]$ | $\delta_H[(cal/ccm)^{\frac{1}{2}}]$ |
| --- | --- | --- |
| $\gamma$-butyrolactone | 8.3 | 3.7 |
| Nitropropane | 6.05 | 2.05 |
| Cyclohexanone | 3.1 | 2.5 |
| THF | 2.8 | 3.9 |
| Acetone | 5.1 | 3.4 |
| Toluene | 7 | 1 |
| Methyl isobutyl ketone | 3 | 2 |
| Butyl acetate | 1.8 | 3.1 |

-continued

|  | $\delta_P[(cal/ccm)^{\frac{1}{2}}]$ | $\delta_H[(cal/ccm)^{\frac{1}{2}}]$ |
| --- | --- | --- |
| N-methylpyrrolidone | 6 | 3.5 |
| Dichloromethane | 3.1 | 3 |
| o-xylene | 0.5 | 1.5 |
| Diethylether | 1.4 | 2.5 |

In order to prepare the coating composition according to the invention, the electroconductive polymer and, if appropriate, the non-conductive polymer are dissolved or swollen together in the solvent. This is carried out at a temperature between the melting and boiling point of the solvent or solvent mixture employed, preferably in the range 0° C. to 80° C., in particular 20° to 60° C., if appropriate with stirring or other mixing techniques. The overall concentration of the two components in the solvent is 0.1 to 20, preferably 0.5 to 10, % by weight. If required, the other additives are then added.

By varying the mixing ratios between the electroconductive polymer and non-conductive polymer, the properties of the coating composition, such as the surface resistance of the coating, the specific resistance and film formation, and the mechanical properties of the coating, such as transparency, abrasion resistance and resistance to organic and inorganic liquids, can be matched to requirements.

The coating composition can be recovered as such by known methods from the solution or suspension, but the solution or suspension is preferably used further directly.

The solutions can be processed by customary methods, as are employed in the coating of polymer solutions onto any substrates, such as glass, metals, semiconductors and plastics: spin coating, coating from a flat film die, knife coating, dip coating, spray coating, electrostatic spray coating, roller coating, printing and similar processes. The thickness of the coating is determined by the application method, the drying conditions and the viscosity of the solutions and is usually in the range 20 nm to 1000 nm.

The thickness of the conductive coating is also dependent to a large extent to the conductivity desired and the transparency. The surface resistance decreases and the transparency deteriorates with increasing coating thickness. The electroconductive polymers used have a specific resistance between $10^{-4}$ S/cm and 10 S/cm, which means that a coating thickness of 100 nm produces a surface resistance between $1 \times 10^9$ ohms and $1 \times 10^4$ ohms. The extinction at a coating thickness of 100 nm has only one weak maxium between 550 nm and 900 nm in the visible region, if any at all, and the principal absorption maximum is in the near infra-red at wavelengths between 1000 nm and 3000 nm; in transmitted light, the coatings usually appear pale blue or grey. This means that the coatings according to the invention are very highly transparent in the visible region and at the same time do the job of dissipating electrical charge very well. Applied coatings of electroconductive polymers made from plastics such as poly-(ethylene terephthalate), polyethylene polypropylene, poly(vinyl chloride), polyacrylonitrile and the like are particularly suitable if they are in addition transparent in the visible spectrum region.

Film webs can be provided in a simple manner with a conductive coating by using the same process and machines as are used, for example, in the coating of photographic films, plastic films or aluminum backings for offset printing plates. In general, the conductive coating need only be applied to one side of the film so long as the substrate is not too thick. However, should it be necessary, the other side of the film can also be provided with a conductive coating. This need not necessarily be identical to the conductive coating on the front.

In addition, materials having a large internal surface area, such as textiles, fabric webs, fibers, sponges, foamed plastics etc. can be coated by dipping.

By applying thin coatings of the coating composition according to the invention in thicknesses of less than 1 $\mu$m, catalysts, electroconductive wires, sensors, semiconductor components, solar cells, protective coatings for solar cells, screening materials, camouflage paints in the infrared and microwave region, conductors for panel heaters, special-purpose electrodes, electroconductive and antistatic films and fibers, antistatic foams, films for record sleeves, conductive backing foils for film materials, in particular for photographic films and for X-ray films, scale covers for measuring equipment, contrast increase for screens in combination with prevention of electrostatic charge either by direct coating of the front of the screen or by placing a coated glass or plastic sheet in front of the screen, or by applying a coated film, and touch panel arrangements for screens can be produced and achieved in a simple manner. The combination of the particular properties of the soluble electroconductive polymers with non-conductive polymers makes it possible to use them in applications where it was hitherto impossible to do so, since the customary conductive polymers were not soluble in the doped state. Thus, processes which are employed in the production of components in microelectronics can be used analogously: spin-coating, structuring using known processes of thin-film technology, for example using photosensitive paint or resist.

The examples below are intended to further illustrate the invention. The amounts specified relate to the weight.

EXAMPLE 1

4.34 parts of tetraethylammonium tetrafluoroborate, 4.53 parts of 3-nonyloxythiophene and 200 parts of acetonitrile were introduced into an undivided electrolysis cell equipped with a cooling jacket. The cathode comprised V2A steel sheet 60 mm in length and 55 mm in width. The anode employed was a carbon felt (weight per unit area 0.4 kg/m$^2$, specific surface area (BET) about 1.5 m$^2$/g) 60 mm in length, 55 mm in width and 4 mm in thickness. The anode was mounted parallel to the cathode at a distance of 2 cm, separated by a spacer made from polypropylene netting. At an electrolysis temperature of 20° C. and an anode current of 100 mA, a cell voltage of from 3 to 6 volts was obtained. After half the theoretically necessary amount of current, the anode, charged with the polymers, was replaced by a fresh anode, and the electrolysis was terminated after the theoretical amount of current had been consumed. The anodes charged with the crude product were placed, after drying, in a bath containing hexane, where they were digested several times for a relatively long period. After drying, the carbon felts charged with the polymers were digested in a bath containing tetrahydrofuran until the polymers had dissolved virtually completely. The solution was filtered through a glass filter crucible of pore size G3, and the filtrate was evaporated to dryness in a rotary evaporator. The crude product was comminuted mechanically, washed with water, dried, washed with pentane and re-dried. 1.5 parts of a blue-black, lustrous solid were obtained. The elemental analysis gave the following values: 64.3% C, 8.4% H, 13.8% S and 5.4% F. A powder disk of the ground product had a specific conductivity of $4.8 \times 10^{-3}$ S/cm. On DTG, a weight loss of less than 10% was observed up to 220° C. The GPC of the undoped form gave a mean molecular weight (weight average) of 4500.

The following components were dissolved by stirring in 20 cm$^3$ of acetonitrile, 40 cm$^3$ of cyclohexanone and 40 cm$^3$ of THF: 0.8 g of the above-described electroconductive polymer and 0.2 g of poly(methyl methacrylate) having a melt flow index MFI (230/3.8)=11.0 g/10 min, determined in accordance with DIN 53735, and a molecular weight of $1.2 \times 10$ g/mol. The solution was coated onto a glass substrate measuring 50 mm $\times$ 50 mm with the aid of a spin coater at a speed of about 1000 rpm. The thickness of the film was measured using a profilometer and was 120 nm. The coating was provided on the two opposite edges with conductive silver and bonded on each side to two copper wires 50 $\mu$m in diameter. The specific resistance was measured using an electrometer in V/I mode at voltages between $-100$ V and 100 V in 10 V steps. The value determined for the specific resistance was $2 \times 10^3$ ohm.cm. A transmission spectrum was recorded for the same coating, and had a principal peak at 1100 nm and an optical density of 0.37.

The same coating solution was spin-coated onto larger glass plates measuring 20 cm $\times$ 20 cm under the same conditions. Very homogeneous films with an even coating thickness were obtained on the glass. These coated glass plates are highly suitable for increasing the contrast of display screens if they are mounted in front of the screen. Due to their conductivity, they could in addition be used to dissipate electrostatic charge induced by the screen. To this end, the conductive coating was bonded at the edge to a thin copper wire as described above, and the latter was connected to the instrument earth. Soiling of the screen was thereby prevented and the contrast was simultaneously increased.

EXAMPLE 2

Using the same materials as in Example 1, the following solution was prepared: 0.5 g of conductive polymer and 0.5 g of poly(methyl methacrylate) in 50 cm$^3$ of THF, 30 cm$^3$ of cyclohexanone and 20 cm$^3$ of butyl acetate. After spin-coating and measurement as described in Example 1, the following measured values were obtained: coating thickness 140 nm, specific resistance $5 \times 10^3$ ohm.cm. This solution was likewise spin-coated onto larger glass plates and mounted in front of a display unit. Here too, the contrast was improved and a good antistatic action was obtained.

EXAMPLE 3

Using the same materials as in Example 1, the following solution was prepared in 60 cm$^3$ of THF, 20 cm$^3$ of cyclohexanone and 20 cm$^3$ of butyl acetate and spin-coated onto glass plates: 0.2 g of conductive polymer and 0.8 g of poly(methyl methacrylate). Measurement in the above-described manner gave the following data: coating thickness 40.3 nm, specific resistance $4 \times 10^5$ ohm.cm. When mounted in front of a screen, an antistatic action was obtained, but hardly any improvement in contrast.

EXAMPLE 4

4.34 parts of tetraethylammonium tetrafluoroborate, 5.36 parts of 3-dodecyloxythiophene and 200 parts of acetonitrile were introduced into an undivided electrolysis cell equipped with a cooling jacket. The cathode comprised a V2A steel sheet 60 mm in length and 55 mm in width. The anode employed was a platinum sheet 60 mm in length and 55 mm in width. At an electrolysis temperature of 20° C. and an anode current of 50 mA, a cell voltage of from 3 to 6 volts was obtained. After a quarter of the theoretically required amount of current had been consumed, the polymer deposited on the anode was removed mechanically and the anode was re-employed. This process was repeated until the theoretically required amount of current had been consumed. The crude product collected was comminuted mechanically, washed with water, dried, washed with pentane and acetonitrile and re-dried. The product was taken up in tetrahydrofuran, the solution was filtered through a glass filter crucible of pore size G3, and the filtrate was evaporated to dryness in a rotary evaporator. 1.88 parts of a blue-black, lustrous solid were obtained. The elemental analysis gave the following values: 65.7% C, 9.0% H, 11.1% S and 5.3% F. A powder disk of the ground product had a specific conductivity of $1.5 \times 10^{-2}$ S/cm. On the DTG, a weight loss of less than 10% was observed up to 255° C. The DSC exhibited a peak at 350° C. (130 J/g). The GPC of the undoped form gave a mean molecular weight (weight average) of 5400.

1.0 g of this product and 1.0 g of poly(methyl methacrylate) of the same type as in Example 1 were dissolved by stirring in 90 cm$^3$ of THF and 10 cm$^3$ of butyl acetate. A blue-gray solution was obtained which was used in a kiss-coat apparatus to coat a polyester film 1.5m in length and 0.2m in width. The thickness of the film was 125 μm. The film was stuck together in the apparatus to form a continuous loop and was placed over two rollers arranged one above the other. One of the rollers could be driven using a motor. At the lower roller, whose diameter was 200 mm, the film was in contact with the liquid surface of the coating solution, the solution wetting the film and forming a meniscus. With the aid of the driven roller, the film was coated on the surface. A drying device was located on the machine so that the coating could simultaneously be dried. At a belt speed of 3.0 m/min, a very highly adherent coating with a surface resistance of $3.1 \times 10^6$ ohms and an optical density of 0.21 at a wavelength of 1200 nm was thus obtained on the film. The evenness of the coating was excellent and the adhesion to the film coated in this way was flawless even after being drawn over a sharp edge.

EXAMPLE 5

4.34 parts of tetraethylammonium tetrafluoroborate, 5.93 parts of 3-tetradecyloxythiophene and 200 parts of acetonitrile were introduced into an undivided electrolysis cell equipped with cooling jacket. The cathode comprised a V2A steel sheet 60 mm in length and 55 mm in width. The anode employed was a platinum sheet 60 mm in length and 55 mm in width. At an electrolysis temperature of 20° C. and an anode current of 50 mA, a cell voltage of from 3 to 6 volts was obtained. After a quarter of the theoretically required amount of current had been consumed, the polymer deposited on the anode was removed mechanically and the anode was reemployed. This process was repeated until the theoretically required amount of current had been consumed. The crude product collected was comminuted mechanically, washed with water, dried, washed with pentane and acetonitrile and redried. The crude product was taken up in tetrahydrofuran, the solution was filtered through a glass filter crucible of pore size G3, and the filtrate was evaporated to dryness in a rotary evaporator. 2.04 parts of a blue-black, lustrous solid were obtained. The elemental analysis gave the following values: 67.5% C, 10.0% H, 10.1% S, and 4.8% F. A powder disk of the ground product had a specific conductivity of $1 \times 10^{-2}$ S/cm.

1 g of this electroconductive polymer was dissolved in 100 cm$^3$ of a solvent mixture having the following composition: 2 parts of toluene, 6 parts of THF and 2 parts of butyl acetate. 0.8 g of poly(vinyl acetate) (MW about 35000, SP 80 to 100° C.) was added and dissolved by stirring, and the mixture was coated in the same apparatus as described in Example 4, the belt speed being 2.5 m/min. The film used was a 100 μm thick polyester film. A coating with very good adherance to the film and with a surface resistance of $4 \times 10^7$ ohms was obtained.

EXAMPLE 6

The following solution was prepared: 0.6 g of the electroconductive polymer whose preparation is described in Example 4 and 0.4 g of poly(vinyl chloride) (PVC-P, $M_w = 40000$) were dissolved by stirring at room temperature in 40 cm$^3$ of THF, 20 cm$^3$ of butyl acetate, and 40 cm$^3$ of cyclohexanone. This solution was used to coat a PVC film 200 μm in thickness using a commercially available apparatus for spray coating. The thickness of the conductive coating sprayed on depended on the duration of the operation. The surface resistance of the coated film was measured in accordance with DIN 53482 using a protective-ring electrode and was $4 \times 10^6$ ohms, and the optical density was 0.2 at 1300 nm.

EXAMPLE 7

1 g of the electroconductive polymer mentioned in Example 4 and 1.5 g of a styrene-acrylonitrile copolymer were introduced into a solvent mixture comprising 30 cm$^3$ of THF, 10 cm$^3$ of nitromethane, 10 cm$^3$ of N-methylpyrrolidone and 10 cm$^3$ of butyl acetate, and dissolved by stirring at 50° C. This solution was introduced into a screen-printing machine and used to print a PVC film. The printed pattern comprised perpendicular lines 1 mm in width with 1 mm spaces. The surface resistance, measured in accordance with DIN 53482 using a protective-ring electrode was $6 \times 10^7$ ohms.

EXAMPLE 8

The same solution as in Example 7 was used to coat polyacrylonitrile fibres 100 μm in thickness by dipping into the solution. At an exposure time of 1 minute, a coating which adhered well to the fiber surface was obtained. The resistance of the fibres coated in this way was measured by contacting with conductive silver at a distance of 10 mm and was $1 \times 10^6$ ohms.

EXAMPLE 9

The following solution was prepared: 0.5 g of the electroconductive polymer whose preparation is described in Example 4 and 0.5 g of polystyrene (Mw=250000) were dissolved by stirring at room temperature in 40 cm$^3$ of THF and 10 cm$^3$ of cyclohexanone. This solution was warmed to 40° C. and subsequently spin-coated and measured as described in Example 1, giving the following values: coating thickness 110 nm, specific resistance of the coating: $1 \times 10^3$ ohm.cm. The optical density was only 0.06 at 550 nm.

EXAMPLE 10

The following solution was prepared: 3 g of the electroconductive polymer whose preparation is described in Example 4 and 3 g of cyclized rubber resin of the Alpex CK450 type were dissolved by stirring at room temperature in 270 cm$^3$ of THF and 60 cm$^3$ of cyclohexanone. This solution was used to coat a poly(ethylene terephthalate) film 125 μm in thickness in the apparatus described in Example 4, giving the following values: coating thickness 150 nm, specific resistance of the coating: $2 \times 10^3$ ohm.cm. The optical density was 0.08 at 550 nm.

EXAMPLE 11

The following solution was prepared: 6 g of the electroconductive polymer whose preparation is described in Example 4 and 6 g of poly(vinyl chloride) (PVC-P, Mw=40000) were dissolved by stirring at room temperature in 670 cm$^3$ of THF. This solution was used to coat a poly(ethylene terephthalate) film 12 μm in thickness by metering via a flat film die and the coating was dried in a downstream multi-stage dryer, giving the following values: coating thickness 140 nm, specific resistance of the coating $6 \times 10^3$ ohm.cm. The optical density was 0.13 at 550 nm.

We claim:

1. An electroconductive coating composition comprising 10 to 90% by weight of an electrically conducting polymer containing from 10 to 100 structural units which are connected together by linking in the 2-position and/or 5-position, comprising, 60 to 100 mol-% of structural units derived from at least one monomer of the formula (I)

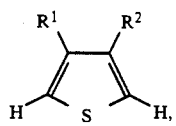

in which
$R^1$ represents a straight-chain or branched $C_6$-$C_{30}$-alkoxy group and
$R^2$ represents a hydrogen atom or a $C_1$-$C_{30}$-alkoxy group, 0 to 40 mol-% of structural units derived from at least one monomer of the formula (II)

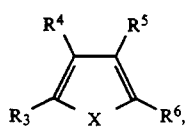

in which
$R^4$ and $R^5$, independently of one another, denote a hydrogen atom, a halogen atom, a $C_1$-$C_{12}$-alkyl group, alkoxyalkyl, arylmethyl, aryl, a $C_1$-$C_4$-alkoxy group or —O(CH$_2$CH$_2$O)$_n$CH$_3$ where n=1 to 4, or form an aromatic ring together with the carbon atoms connecting them, $R^3$ and $R^6$, independently of one another, denote a hydrogen atom or $R^3$ together with $R^4$ and the carbon atoms connecting them or $R^5$ together with $R^6$ and the carbon atoms connecting them in each case form an aromatic ring, X denotes an oxygen atom, a sulfur atom, an NH group, N-alkyl group or N-aryl group, 0 to 40 mol-% of structural units derived from at least one monomer of the formula (III),

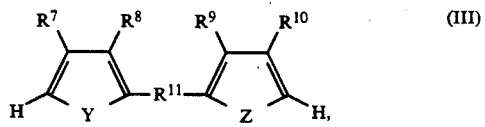

in which
$R^7$, $R^8$, $R^9$ and $R^{10}$, independently of one another, denote a hydrogen atom, a $C_1$-$C_{12}$-alkyl group, an aryl group or a $C_1$-$C_{30}$-alkoxy group,
Y and Z, independently of one another, denote an oxygen atom, a sulfur atom, an the NH group, N-alkyl group or N-aryl group,
$R^{11}$ denotes an arylene group, a heteroarylene group or a conjugated system of formula (—CH=CH—)$_p$ in which p is zero, 1,2 or 3, 0 to 40 mol-% of structural units derived from at least one compound of the formula (IV)

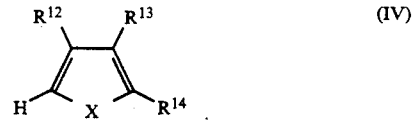

in which
$R^{12}$ and $R^{13}$, independently of one another, denote a hydrogen atom, a halogen atom, a $C_1$-$C_{12}$-alkyl group, a $C_1$-$C_{30}$-alkoxy group, a $C_1$-$C_{12}$-acylamino group or a $C_1$-$C_{12}$-acyloxy group,
$R^{14}$ denotes a halogen atom, a $C_1$-$C_{12}$-alkyl group, a $C_1$-$C_{30}$-alkoxy group, a $C_1$-$C_{12}$-acylamino group, a $C_1$-$C_{12}$-acyl group or a $C_1$-$C_{12}$-acyloxy group, and X is as defined above, 10 to 90% by weight of a non-conductive polymer, and a solvent having $\delta_p$ value of less than 8.5 (cal/ccm)$^{\frac{1}{2}}$ and a $\delta_H$ value of less than 6.5 (cal/ccm)$^{\frac{1}{2}}$ wherein the overall concentration of the two components in the solvent is 0.1 to 20% by weight.

2. A coating composition as claimed in claim 1, wherein the electroconductive polymer and the non-conductive polymer are dissolved or swollen in solvents or solvent mixtures with a $\delta_P$ value of less than 5.5 (cal/ccm)$^{\frac{1}{2}}$ and a $\delta_H$ value of less than 5.0 (cal/ccm)$^{\frac{1}{2}}$.

3. A coating composition as claimed in claim 1, wherein the non-conductive polymer is poly(vinyl formal), poly(vinyl acetal), poly(vinyl butyral), poly(vinyl acetate), poly(vinyl chloride), poly(vinyl methyl ether), poly(vinyl methyl ketone), poly(maleic anhydride), polystyrene, poly-N-vinylcarbazole, poly-N-vinylpyrrolidone, polyvinylpyridine, poly(methyl acrylate), poly(methyl methacrylate), polyacrylonitrile, polyacetaldehyde, polyacrolein, poly(ethylene oxide), polytetrahydrofuran, aliphatic polyesters, polycarbonate, poly(butyl isocyanate), natural rubber, cyclized rubber resins, polyurethane, methylcellulose, ethylcellulose, cellulose triacetate or polymethylsiloxane.

4. The coating composition of claim 1 wherein the overall concentration of the two components in the solvent is 0.5 to 10% by weight.

5. The electroconductive coating composition as claimed in claim 1, wherein there is 10 to 70% by weight of an electrically conducting polymer.

6. The composition as claimed in claim 1, wherein $R^1$ is a straight-chain or branched $C_8$–$C_{22}$-alkoxy.

7. The composition as claimed in claim 10, wherein $R^1$ is a straight-chain or branched $C_{10}$–$C_{16}$-alkoxy.

8. The composition as claimed in claim 1, wherein $R^2$ is a $C_1$–$C_{22}$-alkoxy group.

9. The compositions claimed in claim 8, wherein $R^2$ is a $C_6$–$C_{12}$-alkoxy group.

10. The composition as claimed in claim 1, wherein 90 to 100 mol-% of structural units are derived from at least one monomer of formula (I).

11. The composition as claimed in claim 1, wherein $R^4$ and $R^5$, independently from one another are $C_1$–$C_4$-alkyl, benzyimethyl, thienylmethyl, phenyl, thienyl, $C_1$–$C_2$-alkoxy group, or —O(CH$_2$CH$_2$O)$_n$CH$_3$ wherein n is 1 or 2.

12. The composition as claimed in claim 1, wherein $R^7$, $R^8$, $R^9$ and $R^{10}$ independently of one another are a $C_1$–$C_4$-alkyl group, phenyl, thienyl or a $C_1$–$C_{12}$-alkoxy group.

13. The composition as claimed in claim 1, wherein Y and Z, independently of one another, denote N-$C_1$-$C_4$-alkyl or N-phenyl.

14. The composition as claimed in claim 1, wherein 0 to 10 mol-% of structural units are derived from at least one monomer of formula (II).

15. The composition as claimed in claim 1, wherein 0 to 10 mol-% of structural units are derived from at least one monomer of formula (III).

16. The composition as claimed in claim 1, wherein less than 10 mol-% of structural units are derived from at least one monomer of formula (IV).

17. A process for the preparation of a coating composition as claimed in claim 1, which comprises dissolving or swelling an electroconductive polymer and, a nonconductive polymer together in a solvent with a $\delta_p$ value of less than 8.5 (cal/ccm)$^{\frac{1}{2}}$ and a $\delta_H$ value of less than 6.5 (cal/ccm)$^{\frac{1}{2}}$, and recovering the mixture from the solvent.

18. A film of plastic coated with the coating composition as claimed in claim 1.

* * * * *